US011395960B2

(12) United States Patent
Ham

(10) Patent No.: US 11,395,960 B2
(45) Date of Patent: Jul. 26, 2022

(54) TEMPORAL AXIAL ALIGNMENT ADAPTER FOR VR HAND CONTROLLERS

(71) Applicant: North Carolina State University, Raleigh, NC (US)

(72) Inventor: Derek Allen Ham, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 13 days.

(21) Appl. No.: 16/995,006

(22) Filed: Aug. 17, 2020

(65) Prior Publication Data

US 2020/0376370 A1 Dec. 3, 2020

Related U.S. Application Data

(63) Continuation-in-part of application No. 16/230,390, filed on Dec. 21, 2018, now Pat. No. 10,744,406, which is a continuation-in-part of application No. 29/667,259, filed on Oct. 19, 2018, now Pat. No. Des. 905,071.

(51) Int. Cl.
  *A63F 13/24* (2014.01)
  *G06F 3/01* (2006.01)
  *G06F 3/039* (2013.01)

(52) U.S. Cl.
  CPC .............. *A63F 13/24* (2014.09); *G06F 3/011* (2013.01); *G06F 3/039* (2013.01); *A63F 2300/308* (2013.01); *A63F 2300/8082* (2013.01)

(58) Field of Classification Search
  None
  See application file for complete search history.

(56) References Cited

U.S. PATENT DOCUMENTS

| 5,310,225 A * | 5/1994 | Ruckwardt | F16L 37/101 285/308 |
| 8,550,915 B2 * | 10/2013 | Ashida | A63F 13/06 463/37 |
| 2008/0214306 A1 * | 9/2008 | Ludden | A63F 13/24 463/37 |
| 2009/0088248 A1 * | 4/2009 | Stevens | A63F 13/245 463/36 |
| 2009/0298590 A1 * | 12/2009 | Marks | A63F 13/23 463/37 |

(Continued)

*Primary Examiner* — Tramar Harper
(74) *Attorney, Agent, or Firm* — Thomas | Horstemeyer, LLP

(57) ABSTRACT

Various examples are provided for adapters for virtual reality (VR) hand controllers. The adapters can be coupled to hold the VR controllers in temporal axial alignment. In one example, an adapter includes a first end, a second end and one or more cross members connecting the first and second ends. The first adapter coupled to the second adapter in a fixed temporal orientation via a first coupling assembly installed in the first end or the second end of the first adapter and a second coupling assembly installed in the first end or the second end of the second adapter. For example, the first and second coupling assemblies can include a post coupling assembly and a recess coupling assembly. In another example, a system including two adapters can be coupled together to hold VR hand controllers in a fixed orientation with each other, e.g., in temporal axial alignment.

21 Claims, 10 Drawing Sheets

(56) References Cited

U.S. PATENT DOCUMENTS

| | | | | |
|---|---|---|---|---|
| 2011/0034250 A1* | 2/2011 | Brandt | ............ | A61F 13/06 |
| | | | | 463/37 |
| 2011/0053690 A1* | 3/2011 | Chong | ............ | A63F 13/235 |
| | | | | 463/37 |
| 2011/0190056 A1* | 8/2011 | Xu | ............ | A63F 9/24 |
| | | | | 463/36 |
| 2011/0306424 A1* | 12/2011 | Kazama | ............ | A63F 13/837 |
| | | | | 463/37 |
| 2012/0122576 A1* | 5/2012 | Mao | ............ | A63F 13/837 |
| | | | | 463/32 |
| 2014/0066206 A1* | 3/2014 | Gale | ............ | A63F 13/218 |
| | | | | 463/37 |
| 2016/0361637 A1* | 12/2016 | Higgins | ............ | A63F 13/213 |
| 2017/0128828 A1* | 5/2017 | Long | ............ | A63F 13/235 |
| 2017/0329440 A1* | 11/2017 | Sturm | ............ | G06T 19/006 |
| 2019/0015739 A1* | 1/2019 | May | ............ | A63F 13/211 |
| 2020/0269130 A1* | 8/2020 | Provancher | ............ | G06F 3/016 |

\* cited by examiner

TEMPORAL AXIAL ALIGNMENT ADAPTER FOR VR HAND CONTROLLERS

CROSS REFERENCE TO RELATED APPLICATIONS

This application is a continuation in part that claims priority to, and the benefit of, co-pending U.S. design application entitled "Temporal Axial Alignment Adapter for VR Hand Controllers" having Ser. No. 16/230,390, filed Dec. 21, 2018, which claims priority to, and the benefit of, U.S. design application entitled "Temporal Axial Alignment Adapter for VR Hand Controller" having Ser. No. 29/667,259, filed Oct. 19, 2018, both of which are hereby incorporated by reference in their entireties.

BACKGROUND

Virtual reality (VR) applications can be applied to a wide range of settings such as education, healthcare, entertainment, aviation, military, construction and industrial settings in addition to gaming. VR systems are typically implemented on a computing device, and generally include both visual and audio interfaces to immerse a user in a three-dimensional (3D) virtual environment. The most common interfaces are head mounted displays that surround the eyes to provide 3D visual and headphones for 3D audio. Hand controllers provide means for input in response to the VR stimulation received through the interfaces. The VR system can track the position and orientation of the user's head in order to provide appropriate perspectives, and other body parts to allow for interaction with the VR environment.

SUMMARY

Aspects of the present disclosure are related to adapters for VR hand controllers, which can provide alignment of the VR hand controllers. In one aspect, among others, an adapter comprises a first end, a second end and one or more cross members connecting the first end to the second end of the adapter. The first end can comprise a controller recess configured to secure a VR hand controller in a fixed alignment with a longitudinal axis of the adapter and a first alignment recess extending inward from an end surface of the first end towards the controller recess. The second end can comprise a second alignment recess extending inward from an end surface of the second end. The longitudinal axis can extend through a center of the first alignment recess and a center of the second alignment recess. An end cap can be secured in the first alignment recess or the second alignment recess, the end cap comprising magnet components configured to magnetically couple the first end or the second end of the adapter to a first end or a second end of another adapter. The magnetic coupling can provide temporal axial alignment of the adapters.

In various aspects, the adapter can comprise a second end cap secured in the first alignment recess or the second alignment recess. A portion of the VR hand controller can engage with the controller recess to secure the VR hand controller in the fixed alignment with the longitudinal axis of the adapter. A handle of the VR hand controller can be inserted in the controller recess to align the VR hand controller with the longitudinal axis of the adapter. The first end can comprise a safety opening adjacent to the closed end of the controller recess, the safety opening allowing a safety attachment to extend from the controller recess. The safety attachment can be a wrist strap secured to the VR hand controller. In one or more aspects, an inner surface of the first and second alignment recesses and an outer surface of the end cap are threaded to secure the end cap in the first alignment recess or the second alignment recess. The first end of the adapter can be magnetically coupled to the first end of the other adapter. The first end of the adapter can be magnetically coupled to the second end of the other adapter. The second end of the adapter can be magnetically coupled to the second end of the other adapter.

In another aspect, a system comprises a first adapter comprising a first end, a second end and one or more cross members connecting the first and second ends of the first adapter, the first end comprising a controller recess configured to secure a first VR hand controller in a fixed alignment with a longitudinal axis of the first adapter. The system can further comprise a second adapter comprising a first end, a second end and one or more cross members connecting the first and second ends of the first adapter, the first end comprising a controller recess configured to secure a second VR hand controller in a fixed alignment with a longitudinal axis of the second adapter. The first adapter can be coupled to the second adapter in a fixed temporal orientation via a first coupling assembly installed in the first end or the second end of the first adapter and a second coupling assembly installed in the first end or the second end of the second adapter. In various aspects, the first coupling assembly can be affixed in a first alignment recess of the first adapter, the first alignment recess centered about the longitudinal axis of the first adapter, and the second coupling assembly can be affixed in a second alignment recess of the second adapter, the second alignment recess centered about the longitudinal axis of the second adapter. The longitudinal axis of the first adapter can be in temporal axial alignment with the longitudinal axis of the second adapter. The first coupling assembly of the first adapter can magnetically couple to the second coupling assembly of the second adapter.

In one or more aspects, the first end of the first adapter can comprise a first alignment recess extending inward from an end surface of the first end towards the controller recess, and the second end of the first adapter can comprise a second alignment recess extending inward from an end surface of the second end. The first end of the second adapter can comprise a third alignment recess extending inward from an end surface of the first end towards the controller recess, and the second end of the second adapter can comprise a fourth alignment recess extending inward from an end surface of the second end. A first end cap comprising magnet components can be secured in the first or second alignment recess, and a second end cap comprising magnet components can be secured in the third or fourth alignment recess. The first and second end caps can be configured to magnetically couple the first or the second end of the first adapter to the first or second end of the second adapter. the first end of the first and second adapters comprise a safety opening adjacent to the closed end of the controller recess, the safety opening allowing access to a safety attachment of the first and second VR hand controllers. The first end of the first and second adapters can comprise a safety opening adjacent to the closed end of the controller recess, where the safety opening allows access to a safety attachment of the first and/or second VR hand controllers. The safety attachment can be a wrist strap secured to the first or second VR hand controller. The first adapter can be coupled to the second adapter in a fixed temporal orientation via an extension bar coupled between the first coupling assembly and the second coupling assembly. The first adapter can be held in temporal axial alignment with the second adapter through the extension bar.

In another aspect, an adapter comprises a first end, a second end and one or more cross members connecting the first end to the second end of the adapter. The first end can comprise a controller recess configured to secure a VR hand controller in a fixed alignment with a longitudinal axis of the adapter and an alignment post extending outward from an end surface of the first end away from the controller recess. The alignment post can comprise a securing tab extending radially outward from a side at a distal end of the alignment post. The second end can comprise an alignment recess extending inward from an end surface of the second end and sized for insertion of the alignment post into the alignment recess. The alignment recess can comprise an insertion channel extending along an inner side of the alignment recess from the end surface of the second end, the insertion channel substantially parallel to the longitudinal axis of the adapter, and a locking groove extending around at least a portion of a circumference of the alignment recess and intersecting with the insertion channel, the locking groove substantially perpendicular to the insertion channel. The one or more cross members can connect the first end to the second end of the adapter where the longitudinal axis extends through a center of the alignment post and a center of the alignment recess. The alignment post can be configured to mechanically couple the first end of the adapter to a second end of another adapter by engagement of the securing tab in the locking groove via the insertion channel, the mechanical coupling providing temporal axial alignment of the adapters.

In various aspects, the locking groove can extend around the circumference of the alignment recess. The locking groove can be at a distal end of the alignment recess, opposite the end surface of the second end. the distal end of the alignment recess can be open or enclosed. The securing tab can be located on a first side of the longitudinal axis of the adapter, and the insertion channel can be located on a second side of the longitudinal axis opposite the first side. The controller recess can be configured to at least partially encircle a portion of the VR hand controller when inserted in the controller recess to secure the VR hand controller in the fixed alignment with the longitudinal axis of the adapter. The controller recess can be configured to encircle the portion of the VR hand controller when inserted in the controller recess. The first end can comprise a safety opening adjacent to the controller recess, the safety opening allowing a safety attachment of the VR hand controller to extend through the safety opening.

In one or more aspects, the first end can comprise a controller recess configured to secure a VR hand controller in a fixed alignment with a longitudinal axis of the adapter and an alignment recess extending inward from an end surface of the first end. The alignment recess can comprise an insertion channel extending along an inner side of the alignment recess from the end surface of the first end, the insertion channel substantially parallel to the longitudinal axis of the adapter, and a locking groove extending around at least a portion of a circumference of the alignment recess and intersecting with the insertion channel, the locking groove substantially perpendicular to the insertion channel. The second end can comprise an alignment post extending outward from an end surface of the second end and sized for insertion into the alignment recess, the alignment post comprising a securing tab extending radially outward from a side at a distal end of the alignment post. The one or more cross members can connect the first end to the second end of the adapter where the longitudinal axis extends through a center of the alignment post and a center of the alignment recess. The alignment post can be configured to mechanically couple the second end of the adapter to a first end of another adapter by engagement of the securing tab in the locking groove via the insertion channel, the mechanical coupling providing temporal axial alignment of the adapters. The locking groove can extend around the circumference of the alignment recess. The locking groove can be at a distal end of the alignment recess, opposite the end surface of the second end. The securing tab can be located on a first side of the longitudinal axis of the adapter, and the insertion channel can be located on a second side of the longitudinal axis opposite the first side.

In some aspects, a system comprises a first adapter comprising a first end, a second end and one or more cross members connecting the first and second ends of the first adapter, the first end comprising a controller recess configured to secure a first VR hand controller in a fixed alignment with a longitudinal axis of the first adapter. The system can further comprise a second adapter comprising a first end, a second end and one or more cross members connecting the first and second ends of the second adapter, the first end comprising a controller recess configured to secure a second VR hand controller in a fixed alignment with a longitudinal axis of the second adapter. The first adapter can be mechanically coupled to the second adapter in a fixed temporal orientation via a post coupling assembly installed in the first end or the second end of the first adapter and a recess coupling assembly installed in the first end or the second end of the second adapter. The longitudinal axis of the first adapter can be in temporal axial alignment with the longitudinal axis of the second adapter. The first adapter can be coupled to the second adapter in a fixed temporal orientation via an extension bar coupled between the post coupling assembly and the recess coupling assembly. The first adapter can be held in temporal axial alignment with the second adapter through the extension bar.

In various aspects, the first end of the first adapter can comprise the post coupling assembly and the second end of the second adapter can comprise the recess coupling assembly, or the second end of the first adapter can comprise the post coupling assembly and the first end of the second adapter can comprise the recess coupling assembly. The post coupling assembly can include an alignment post extending outward from an end surface of the first end away from the controller recess, the alignment post comprising a securing tab extending radially outward from a side at a distal end of the alignment post. The recess coupling assembly including an alignment recess extending inward from an end surface of the second end and sized for insertion of the alignment post into the alignment recess, the alignment recess comprising an insertion channel extending along an inner side of the alignment recess from the end surface of the second end, the insertion channel substantially parallel to the longitudinal axis of the second adapter, and a locking groove extending around at least a portion of a circumference of the alignment recess and intersecting with the insertion channel, the locking groove substantially perpendicular to the insertion channel. The locking groove can extend around the circumference of the alignment recess.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
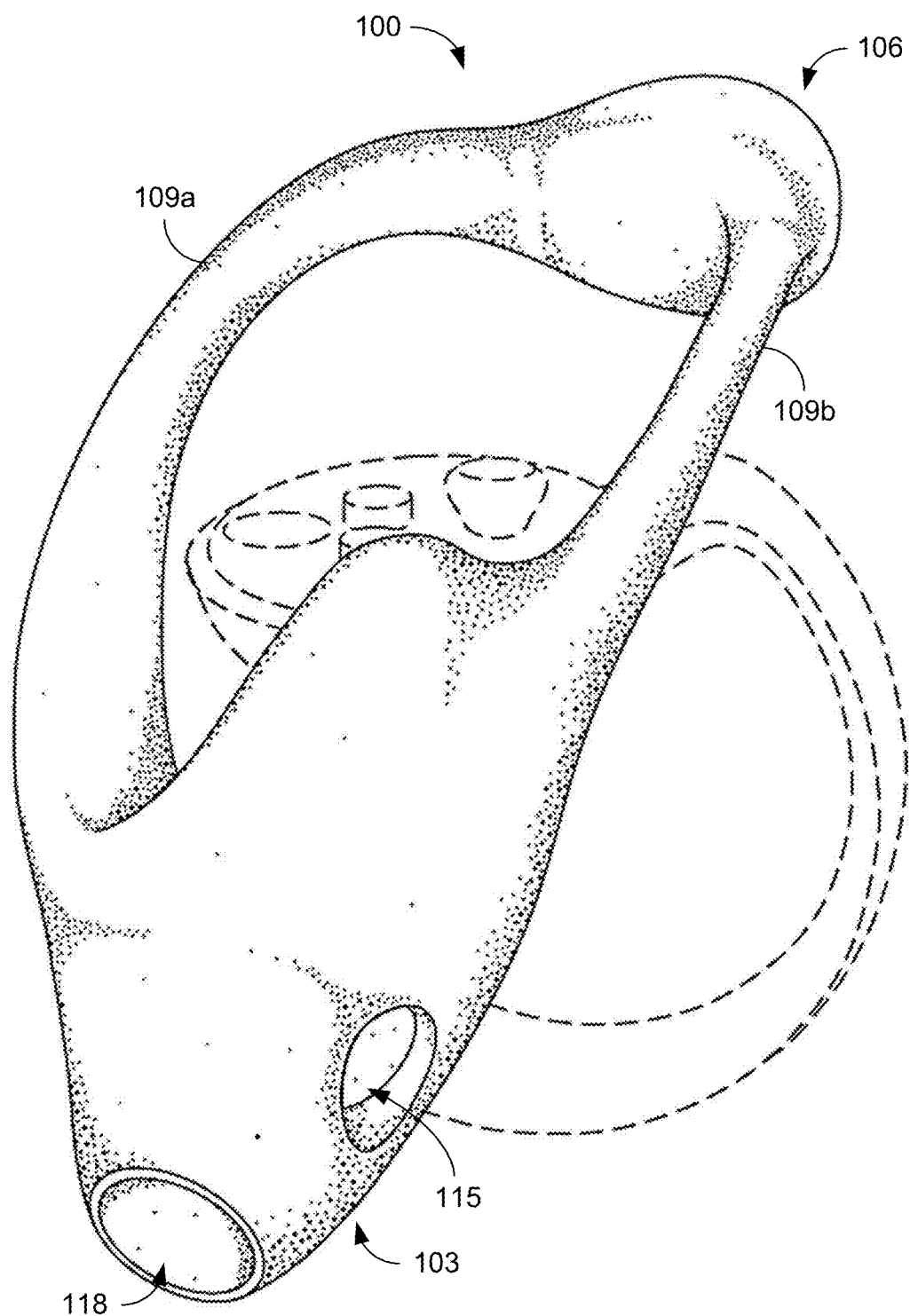
FIG. 1 is a perspective view of an example of a temporal axial alignment adapter, in accordance with various embodiments of the present disclosure.

Disclosed herein are various embodiments related to adapters for VR hand controllers. The adapters can provide temporal axial alignment of the VR hand controllers. Reference will now be made in detail to the description of the embodiments as illustrated in the drawings, wherein like reference numbers indicate like parts throughout the several views.

VR games (or applications) are not typically designed or played with the user's hands in axial alignment. Those VR experiences that do require this action try to compensate for the controller's inability to physically align with each other. The disclosed adapters allow the hand controllers to be positioned and temporally locked into a fixed axial alignment. The VR hand controllers can be slipped into controller recesses in corresponding adapters, which hold the controllers in the adapters. The adapters are designed to allow the VR controllers to be locked into axial alignment. For VR usage, coupling of the VR controllers in a fixed alignment improves any scenario in which hands need to be aligned on axis to grab or interact with virtual objects.

Referring to FIG. 1, shown a perspective view of an example of a temporal axial alignment adapter 100. The adapter 100 includes a first end 103 configured to receive a VR hand controller and a second end 106 opposite the first end 103. The first and second ends 103 and 106 are connected by one or more cross members 109 (e.g., 109a and 109b), which secure the first end 103 and second end 106. The cross members 109 can be located at various positions about the adapter 100. The shape of the first end 103, second end 106 and cross members 109 can be designed to provide an aesthetically pleasing appearance, which can be sleek and streamlined as illustrated in FIG. 1. Referring next to FIGS. 2A-2D, shown are side views of the temporal axial alignment adapter 100 of FIG. 1. The first and second ends 103 and 106 of the adapter 100 are connected by cross members 109, which secure the first end 103 and second end 106 in alignment along a longitudinal axis (dashed line) of the adapter 100. The cross members 109 can be located at various positions about the longitudinal axis to connect the first and second ends 103 and 106.

As illustrated in FIGS. 2A-2D, the first end 103 is larger than the second end 106, and is configured to receive at least a portion of a VR hand controller in a controller recess 112. The controller recess 112 includes an open end to receive the VR controller. Various portions of the VR controller can make contact with the inner surface of the controller recess 112 at one or more locations, thereby holding the VR controller in alignment with the longitudinal axis of the adapter 100. The controller recess 112 can be closed opposite the open end, and the shape of the inner surface can be varied as is desired to allow for the insertion of one or more types of VR controllers. In some implementations, an ejection opening can be provided at the closed end of the controller recess 112 (e.g., aligned with the longitudinal axis) to aid in the removal of the VR controller from the adapter 100. This ejection opening may be sized to allow a finger or other instrument to access a portion of the installed VR controller so that pressure can be applied to assist with removal of the VR controller from the adapter 100. A removable cover can be provided to seal the ejection opening when the adapter 100 is being used.

The first end 103 also includes a safety opening 115 adjacent to the closed end of the controller recess 112 to allow a wrist strap (or other safety attachment) on the VR controller to pass through the adapter 100. While a circular opening is illustrated, other shapes for the safety opening 115 (e.g., oval or other geometric shape) can be utilized as desired. The sidewall of the safety opening 115 can be tapered outward such that the size of the safety opening 115 is larger at the outer surface of the adapter 100 and smaller at the inner surface of the controller recess 112.

Figures 2A, 2B:
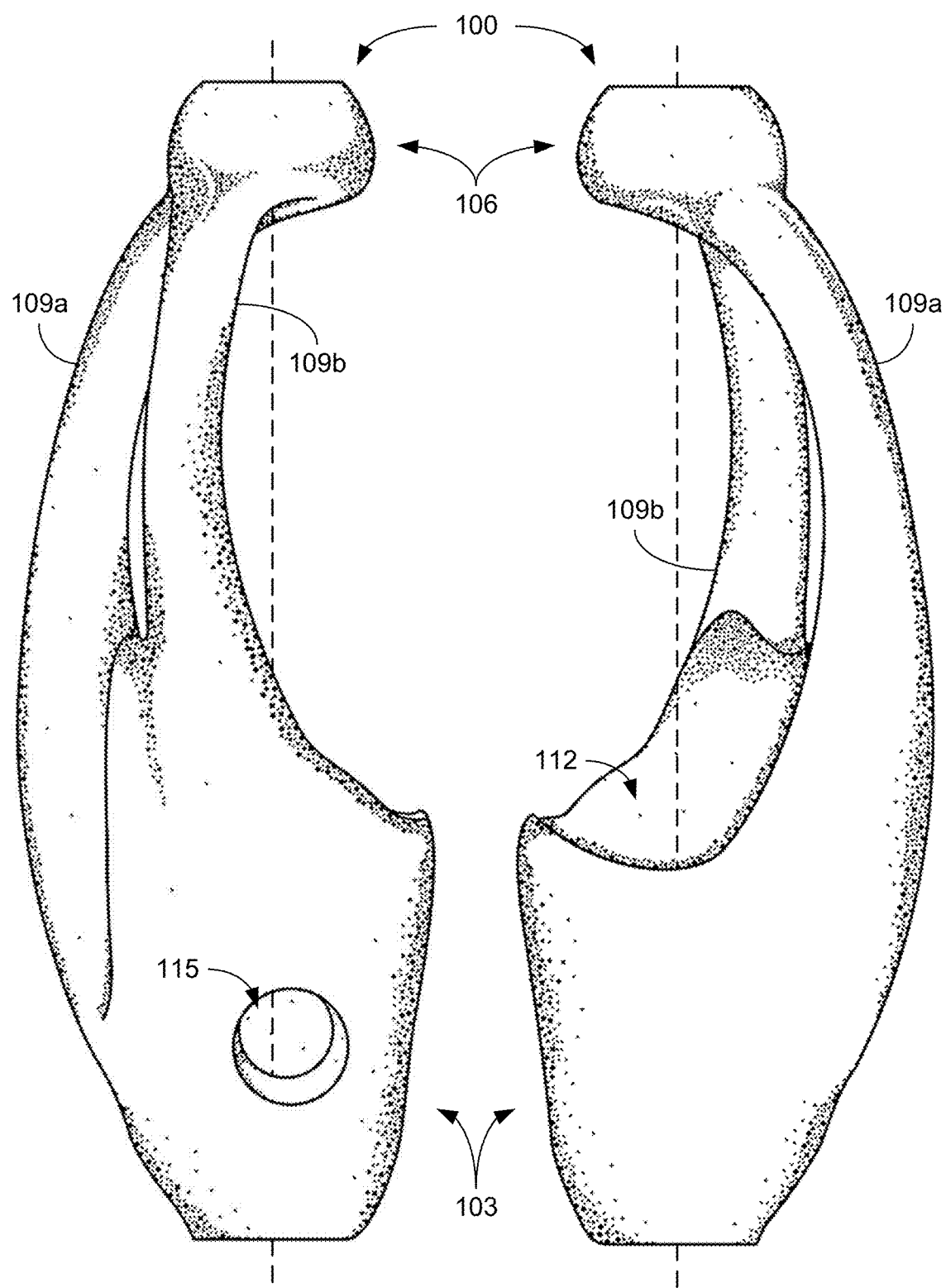
FIGS. 2A-2D are side views of the temporal axial alignment adapter of FIG. 1, in accordance with various embodiments of the present disclosure.
Figures 2C, 2D:
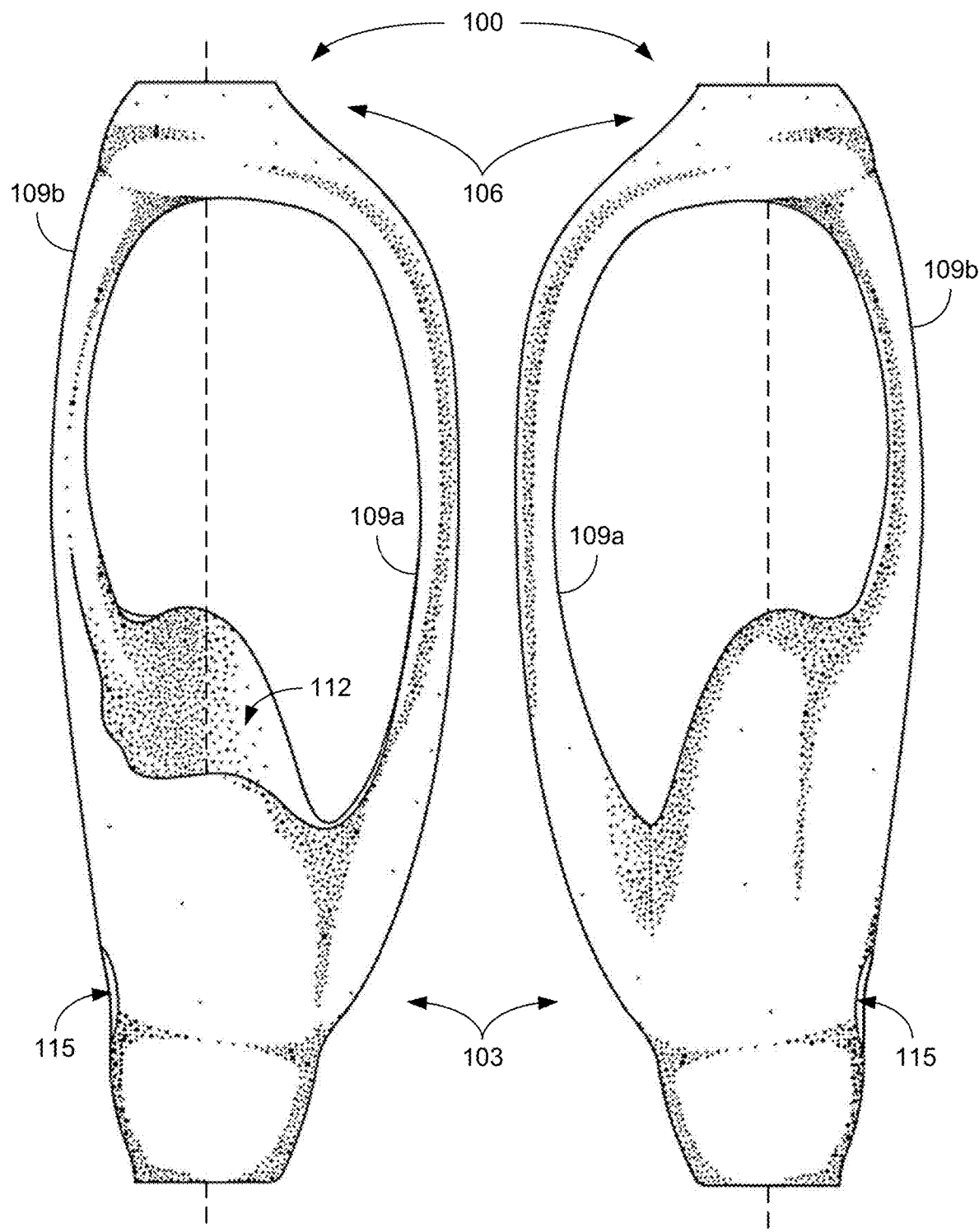

The shape and positioning of the cross members 109 can be varied to provide a desired appearance while allowing access of the VR controller to the controller recess 112. In the example of FIGS. 1 and 2A-2D, a first cross member 109a curves outward from the second end 106 and curves back inward to attach to the first end 103, while a second cross member 109b follows a path that while slightly curved is substantially parallel with the longitudinal axis. The diameters of the cross members 109 are reduced in the center sections to provide a clean look and feel, and to blend with the overall appearance of the adapter 100. As can be seen in FIGS. 2A and 2B, the cross members 109 are offset to one side of the longitudinal axis to facilitate access to the controller recess 112. In addition, the open end of the controller recess 112 can be lower on one side as shown in FIG. 2C to aid in the insertion of the VR controller into the adapter 100.

Figure 3A:
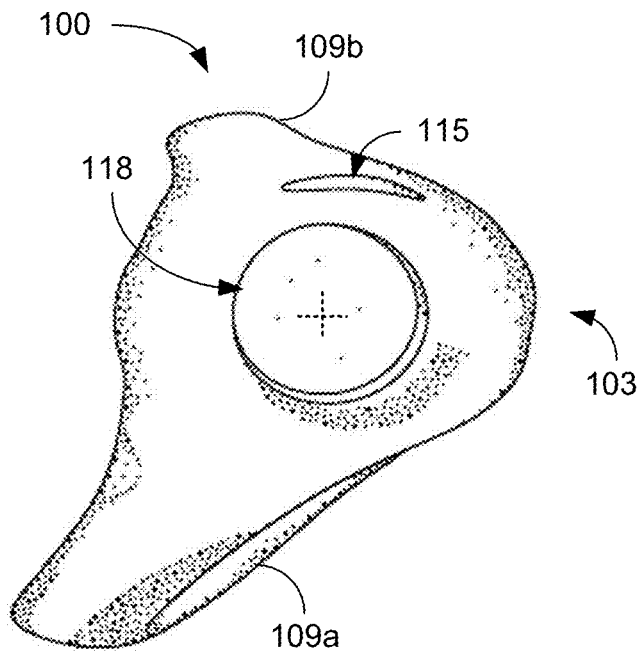
FIGS. 3A and 3B are end views of the temporal axial alignment adapter of FIG. 1, in accordance with various embodiments of the present disclosure.
Figure 3B:
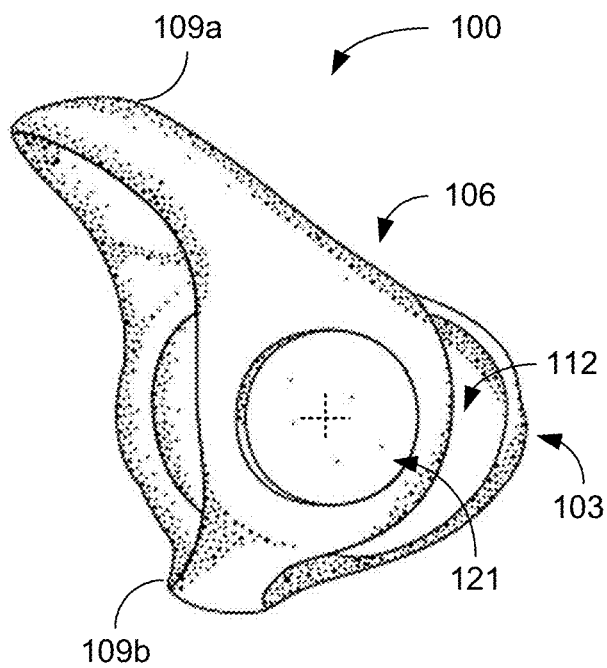

Referring now to FIGS. 3A and 3B, shown are views of the first and second ends 103 and 106 of the temporal axial alignment adapter 100 of FIG. 1, respectively. As illustrated in FIG. 3A, the first end 103 of the adapter 100 includes the safety opening 115 to allow a wrist strap (or other safety attachment) on the VR controller to pass through the adapter 100. In addition, the first end 103 includes a first alignment recess 118 centered about the longitudinal axis of the adapter 100. The first alignment recess 118 extends inward from the end of the adapter 100 towards the closed end of the controller recess 112. The second end 106 of the adapter 100 includes a second alignment recess 121 centered about the longitudinal axis of the adapter 100. The second alignment recess 121 extends inward from the end of the adapter 100. The depth of the alignment recesses 118 and 121 can be based upon a coupling assembly used to temporally lock the adapters 100 into a fixed axial alignment.

Figures 4, 5:
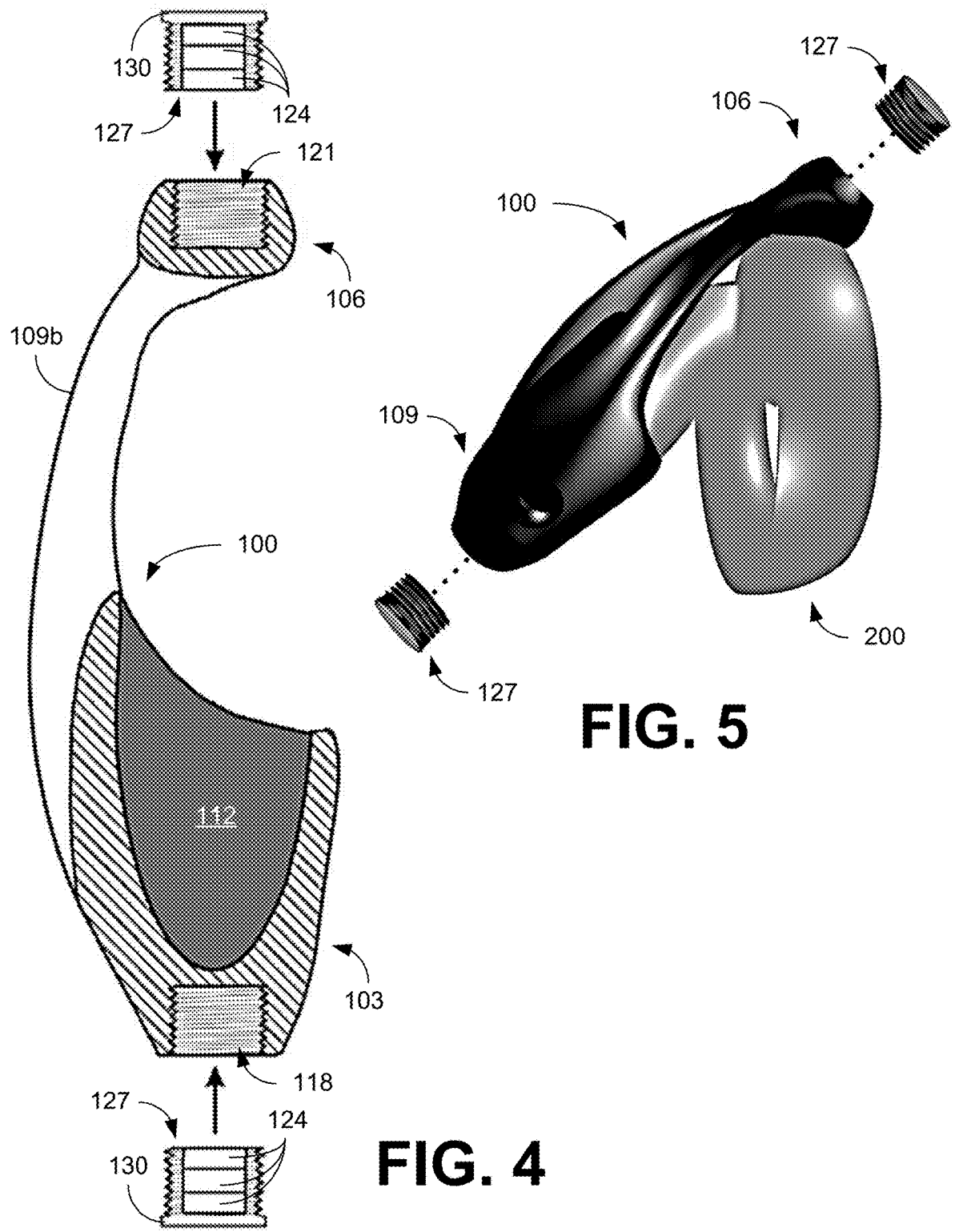
FIG. 4 is a cross-sectional view of the temporal axial alignment adapter of FIG. 1, in accordance with various embodiments of the present disclosure.
FIG. 5 is a graphical illustration of a VR controller installed in the temporal axial alignment adapter of FIG. 1, in accordance with various embodiments of the present disclosure.

This may be better illustrated in the cross-sectional view of FIG. 4, which shows the first alignment recess 118 extending into the first end 103 of the adapter 100 but stopping before the controller recess 112 is reached. In some implementations, the first alignment recess 118 can extend inward to the controller recess 112, providing access to the closed end of the controller recess 112 through an ejection opening formed between the controller recess 112 and alignment recess 118. The size of the ejection opening can be less than the diameter of the alignment recess 118 to provide a lip (or stopping surface) at the end of the first alignment recess 118. This can limit the depth that the coupling assembly can be inserted into the first alignment recess 118 and avoid insertion into the controller recess 112. Similarly, FIG. 4 shows the second alignment recess 121 extending into the second end 106 but stopping before passing through the second end 106 of the adapter 100. While the second alignment recess 121 can be extended through the second end 106 of the adapter 100 in some embodiments, a smooth outer surface can be maintained by not extending the second alignment recess 121 through the second end 103.

In the example of FIG. 4, the coupling assembly includes magnetic components 124 (e.g., permanent magnets) that can be inserted into the alignment recesses 118 and 121, and secured in position using an end cap 127 surrounding the magnet components 124. As shown in FIG. 4, the magnet components 124 can be removably inserted into the end caps 127 or can be molded into the end caps 127. The end caps 127 can then be secured in the alignment recesses 118 and 121 using, e.g., a friction fit or other appropriate means. In various embodiments, the end cap 124 can be affixed within the alignment recesses 118 and 121 by threads that can be screwed together as illustrated in FIG. 4, tabs that can be locked into corresponding slots, or other appropriate attachment device. For example, tabs can be located on the outer surface of the end cap 127 or the inner surface of the alignment recess 118 or 121 with corresponding slots located on the inner surface of the alignment recess 118 or 121 or the outer surface of the end cap 127. The slots can be L-shaped allowing the tabs to be inserted into the slot and twisted to lock the end cap 127 in position. The end cap 127 can be designed to be secured in the alignment recess 118 or 121 with the end cover 130 of the end cap 127 extending over a portion of an end surface of the first end 103 or second end 106, or with the external surface of the end cover 130 substantially aligned with the end surface of the first end 103 to provide a smooth surface for coupling.

The end caps 127 can be reconfigurable to allow for different couplings of the adapters 100. To this end, the end caps 127 include slots, recesses or tabs that can facilitate insertion of the end caps 127 into, and removal from, the alignment recesses 118 and 121. Other coupling assemblies such as, e.g., threaded rods or fittings or snap-fit connectors can be used to secure the adapters in temporal axial alignment. In addition, the alignment recesses 118 and 121 allow a variety of add on fixtures to be attached between the coupled adapters 100. For instance, an extension bar can be positioned between the adapters 100 providing an extended length between the VR controllers to simulate different configurations (e.g., a paddle for simulated kayaking). The extension bar can include magnet components (or other coupling assembly) at the two ends of the extension bar, allowing it to be removably connected between the adapters 100. The magnet components can be secured in alignment recesses at the ends of the extension bar, or can be molded in the ends. In some cases, the extension bar can be angled or curved to hold the VR controllers in a fixed orientation that is not axially aligned.

FIG. 5 graphically illustrates an example of a VR hand controller 200 installed in the adapter 100 of FIG. 1. A portion of the VR controller 200 is inserted into the controller recess 112 to hold the VR controller between the first and second ends of the adapter 100, and in a fixed alignment with the longitudinal axis of the adapter 100. As shown in FIG. 5, a handle of the VR controller 200 can be inserted into the controller recess 112 to align the VR controller 200 with the longitudinal axis. The end caps 127 including magnet components 124 are secured in alignment recesses 118 and 121 located at the first and second ends 103 and 106, and centered about the longitudinal axis of the adapter 100.

Figure 6A:
FIGS. 6A-6D are images showing various coupling arrangements of VR controllers installed in the temporal axial alignment adapters of FIG. 1, in accordance with various embodiments of the present disclosure.
Figure 6B:
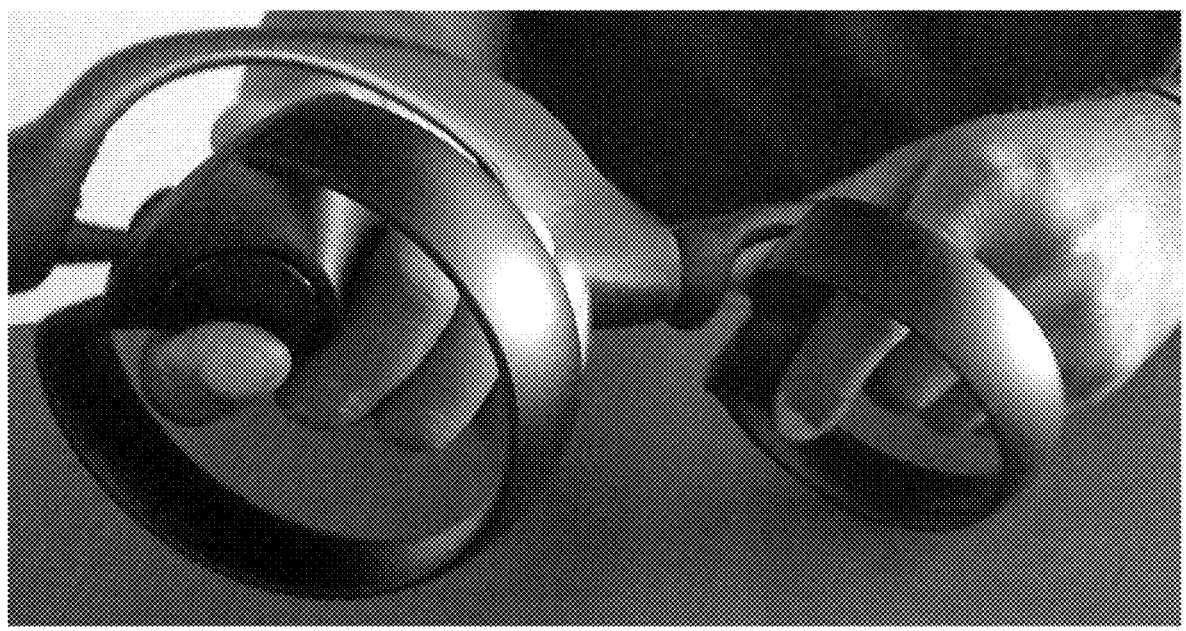
Figure 6C:
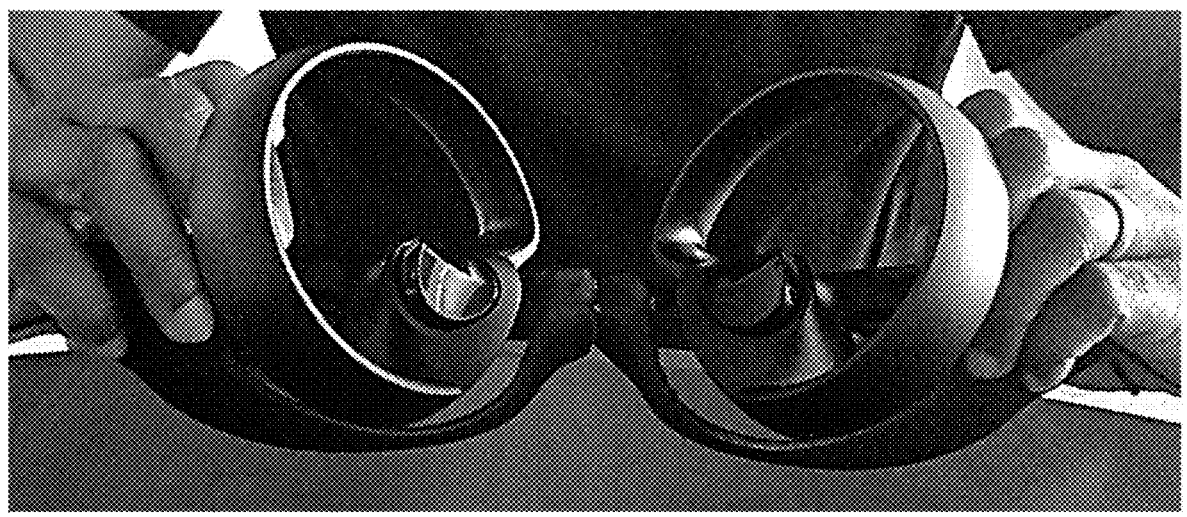
Figure 6D:

By appropriate selection of the magnet components 124, adapters 100 can be magnetically coupled together with the longitudinal axes aligned with each other. The first end 103 of one adapter 100 can be coupled to the first end 103 of another adapter 100, as shown in the image of FIG. 6A, or the first end 103 of one adapter 100 can be coupled to the second end 106 of another adapter 100, as shown in the image of FIG. 6B, or the second end 106 of one adapter 100 can be coupled to the second end 106 of another adapter 100, as shown in the image of FIG. 6C. The images of FIGS. 6A, 6B and 6D illustrate how a user can grip the VR hand controllers 200 while they are held in a fixed temporal axial alignment by the adapters 100 coupled in the different configurations. The ability to quickly disconnect the adapters 100, and reconfigure the end caps 127 with the magnet components 124 (or other coupling assemblies) allows the adapters 100 to be used in a wide range of applications.

VR hand controllers can be secured in adapters 100 by feeding a wrist strap (or other safety attachment) on a handle of the VR controller through the safety opening 115 from the controller recess 112 to the outside of the adapter 100. The wrist strap can be pulled out as the handle of the VR hand controller is inserted into the controller recess 112. With the controller recess 112 extending along the longitudinal axis of the adapter 100, the handle of the VR controller can be held in fixed alignment with the longitudinal axis. By extending the cross members 109 between the first and second ends 103 and 106 on one side of the controller recess 112 can allow better access to the controller recess 112 for insertion of the VR controller. Lowering the side of the opening opposite the cross members 109 can also improve accessibility.

With the VR hand controllers held in the controller recesses 112, the adapters can be coupled together using a coupling assembly such as, e.g., end caps 127 comprising magnet components 124 (or other appropriate coupling assembly). By aligning the end caps 127 on the first and/or second ends 103/106, the adapters 100 can be magnetically coupled together in temporal axial alignment. In some cases, an extension bar can be positioned between the adapters 100 to extend the separation between the VR controllers. The ends of the extension bar can include coupling assemblies that can couple with the ends of the adapters 100. For example, magnet components can be installed in the ends of the extension bar for magnetic coupling with the first and/or second ends 103/106 of the adapters 100.

A straight extension bar can be used to align the longitudinal axis of the adapters 100 to be linearly aligned. If the extension bar is curved or bent, then the longitudinal axes of the adapters 100 can be held in a fixed orientation (e.g., the longitudinal axes are offset from each other by an angle defined by the shape of the extension bar). With the magnetic coupling, the adapters 100 can be decoupled from each other by the user and recoupled in a different orientation. The magnetic coupling can also allow the adapters 100 to be rotated about the longitudinal axis with respect to each other.

Figure 7A:
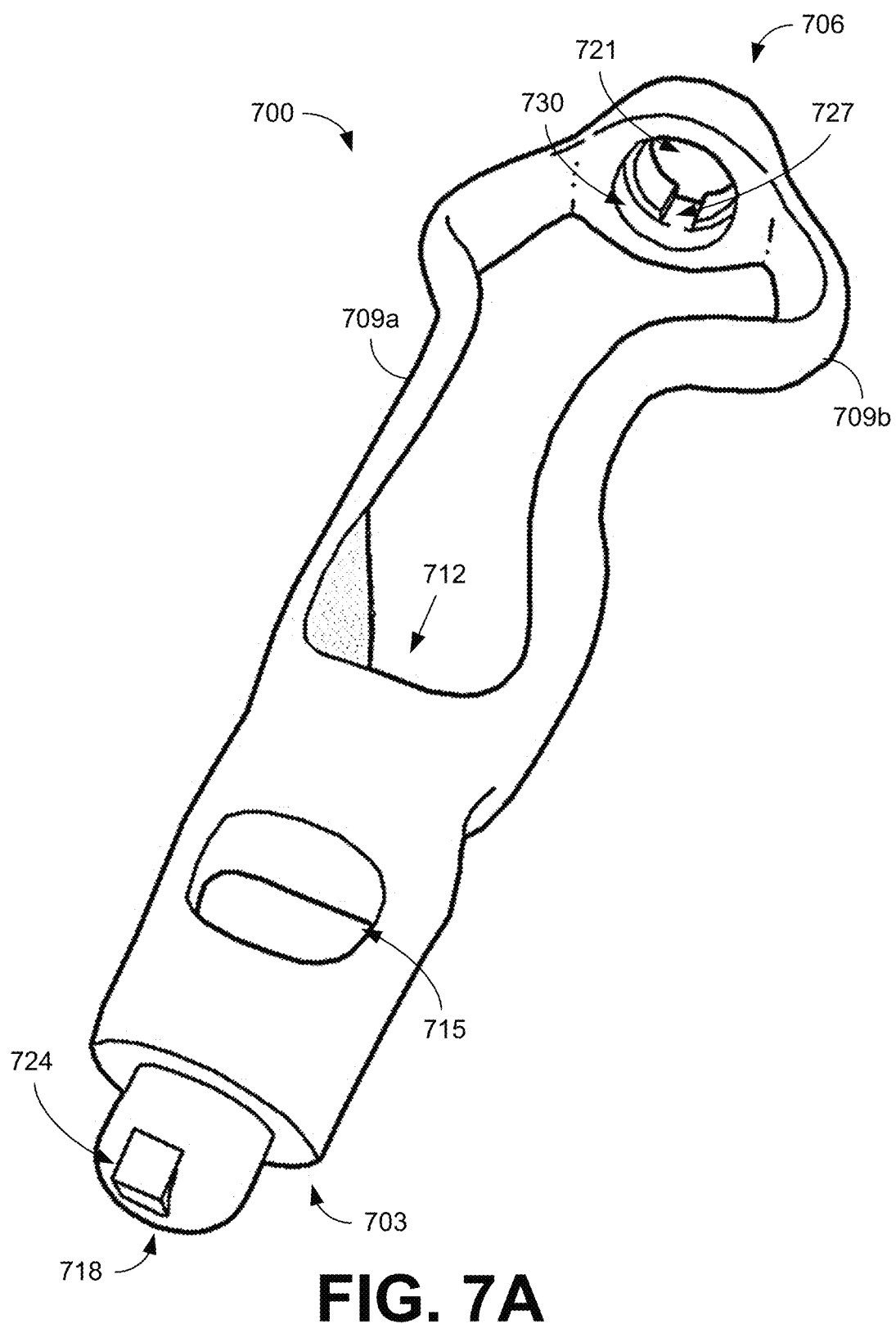
FIGS. 7A and 7B are perspective views of another example of a temporal axial alignment adapter, in accordance with various embodiments of the present disclosure.
Figure 7B:
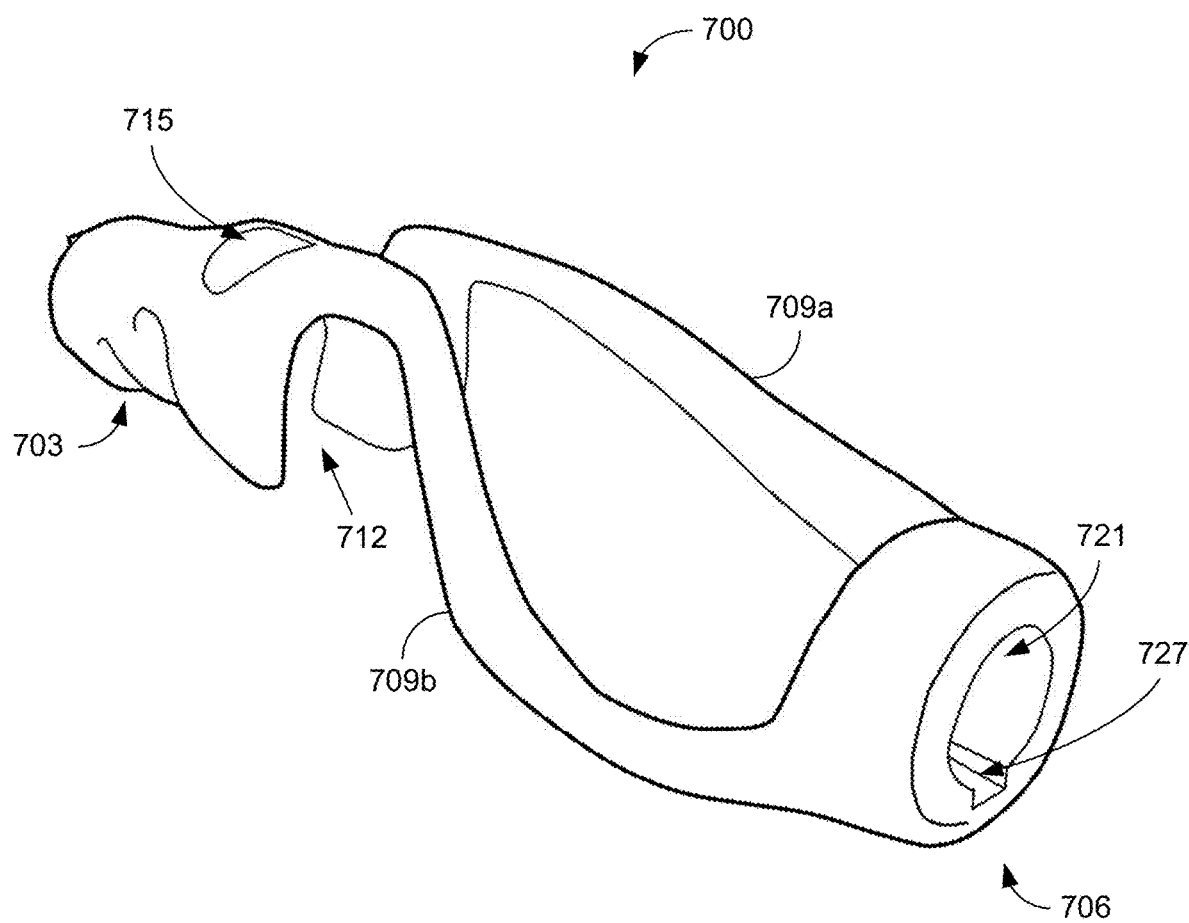
Figures 8A, 8B:
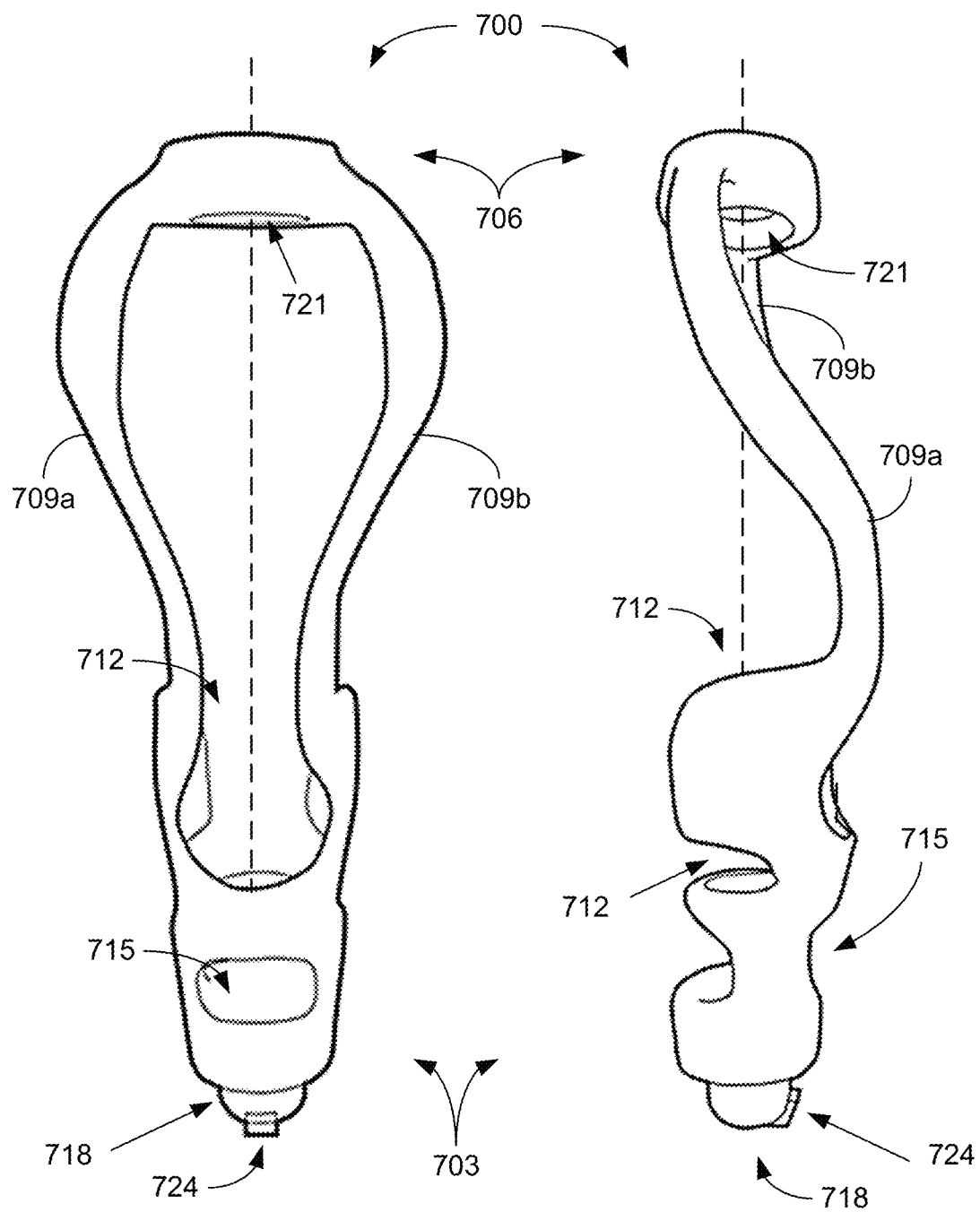
FIGS. 8A and 8B are top and side views of the temporal axial alignment adapter of FIGS. 7A and 7B, in accordance with various embodiments of the present disclosure.

Referring to FIGS. 7A and 7B, shown are perspective views of another example of a temporal axial alignment adapter 700. The adapter 700 includes a first end 703 configured to receive a VR hand controller and a second end 706 opposite the first end 703. The first and second ends 703 and 706 are connected by one or more cross members 709 (e.g., 709a and 709b), which secure the first end 703 and second end 706. The cross members 709 can be located at various positions about the adapter 700. The shape of the first end 703, second end 706 and cross members 709 can be designed to provide an aesthetically pleasing appearance, which can be sleek and streamlined as illustrated in FIG. 7. Referring next to FIGS. 8A and 8B, shown are top and side views of the temporal axial alignment adapter 700 of FIG. 7. The first and second ends 703 and 706 of the adapter 700 are connected by cross members 709, which secure the first end 703 and second end 706 in alignment along a longitudinal axis (dashed line) of the adapter 700. The cross members 709 can be located at various positions about the longitudinal axis to connect the first and second ends 703 and 706.

As illustrated in FIGS. 8A and 8B, the first end 703 is configured to receive at least a portion of a VR hand controller in a controller recess 712. The controller recess 712 includes an open (or proximal) end to receive the VR controller. Various portions of the VR controller can make contact with the inner surface of the controller recess 712 at one or more locations, thereby holding the VR controller in alignment with the longitudinal axis of the adapter 700. The distal end of the controller recess 712 can be open or enclosed opposite the open end, and the shape of the inner surface can be varied as is desired to allow for the insertion of one or more types of VR controllers. In some implementations, an ejection opening can be provided at an enclosed distal end of the controller recess 712 (e.g., aligned with the longitudinal axis) to aid in the removal of the VR controller from the adapter 700. This ejection opening may be sized to allow a finger or other instrument to access a portion of the installed VR controller so that pressure can be applied to assist with removal of the VR controller from the adapter 700.

The first end 703 also includes a safety opening 715 adjacent to the controller recess 712 to allow a wrist strap (or other safety attachment) on the VR controller to pass through the adapter 700. Shapes for the safety opening 715 can include, e.g., circular, oval or other geometric shapes as desired.

The shape and positioning of the cross members 709 can be varied to provide a desired appearance while allowing access of the VR controller to the controller recess 712. In the example of FIGS. 7A and 8A, a first cross member 709a curves outward from the second end 706 and curves back inward to attach to the first end 703, while a second cross member 709b follows a similar (mirror-image) path on the opposite side the longitudinal axis. The diameters of the cross members 709 can be reduced in the center sections to provide a clean look and feel, and to blend with the overall appearance of the adapter 700. As can be seen in FIG. 8B, the cross members 709 are offset to one side of the longitudinal axis to facilitate access to the controller recess 712. In addition, the open end of the controller recess 712 can be lower than the cross members 709 to aid in the insertion of the VR controller into the adapter 700.

In the example of FIGS. 7A-7B and 8A-8B, the first end 703 of the adapter 700 includes an alignment post 718 centered about the longitudinal axis of the adapter 700. The alignment post 718 extends outward from the end of the adapter 700. The second end 706 of the adapter 700 includes an alignment recess 721 centered about the longitudinal axis of the adapter 700. The second alignment recess 721 extends inward from the end of the adapter 700. The alignment recess 721 is sized to receive an alignment post 718 of another adapter 700. For example, the diameters of the alignment post 718 and the alignment recess 721 can be sized for fixed alignment of the alignment post 718 inside the alignment recess 172. The length and depth of the alignment post and recess 718 and 721 can be based upon a coupling assembly used to temporally lock the adapters 700 into a fixed axial alignment. In other embodiments, the second end 706 of the adapter 700 can include the alignment post 718 and the first end of the adapter can include the alignment recess 721.

As illustrated in FIGS. 7A, 8A and 8B, the alignment post 718 can have a rounded end or edges to assist in the insertion into an alignment recess 721. In other implementations, the alignment post 718 can have a squared-off or planar end or can have a linearly tapered edge. The alignment post 718 includes a securing tab 724 at its distal end. As shown in FIGS. 7A, 8A and 8B, the securing tab 724 extends radially outward from a side of the alignment post 718. The securing tab 724 extends outward on a first side of the longitudinal axis of the adapter beyond the radius of the alignment post 718.

As shown in FIGS. 7A and 7B, the alignment recess 721 comprises an insertion channel 727 that extends along an inner side of the alignment recess from the end of the adapter, and substantially parallel with the longitudinal axis. The path of the insertion channel 727 can take on other paths (e.g., angled) as it extends from the end of the adapter inward towards the distal end of the alignment recess 721. The width and depth of the insertion channel 727 is sized to allow the securing tab 721 to align with and travel through the channel as the alignment post 718 is inserted into the alignment recess 721. The alignment recess 721 also includes a locking groove 730 that intersects with the insertion channel 727 and extends around at least a portion of the circumference of the alignment recess 721. The locking groove 730 can be substantially perpendicular to the insertion channel 727. FIG. 7A shows that the locking groove 730 is a circular groove extending around the entire circumference of the alignment recess 721. The locking groove 730 can be located at the distal end of the alignment recess 721 or can be located at an intermediate position between the end of the adapter and the distal end of the alignment recess 721. The locking groove 730 is located on a second side of the longitudinal axis opposite the securing tab 724, that extends outward on the first side.

By appropriate alignment and rotation of the alignment post 718 and alignment recess 721, the adapters 700 can be mechanically coupled together with the longitudinal axes aligned with each other. The first end 703 of one adapter 700 can be coupled to the second end 706 of another adapter 700, or the second end 106 of one adapter 100 can be coupled to the first end 703 of another adapter 700. For example, a first adapter 700 can be rotated about the longitudinal axis about 180 degrees with respect to a second adapter 700. In this position, the alignment post 718 can be inserted into the alignment recess 721 with the securing tab 724 passing through the insertion channel 727. As the alignment post 718 is fully inserted into the alignment recess 721, the securing tab 724 reaches the locking groove 730. Rotation of the first adapter 700 about the longitudinal axis causes the securing tab 724 to move along the locking groove 730, thereby locking the first and second adapters 700 in temporal axial alignment. In some embodiments, the securing tab 724 can transition to a secured position where the rotational alignment of the two adapters 700 is held in a fixed orientation. Where the locking groove 730 is a continuous channel around the circumference of the alignment recess 721, the securing tab 724 can freely rotate in the locking groove 730 while the temporal axial alignment is maintained between the first and second adapters 700. With the first adapter 700 rotated about the longitudinal axis so that the two adapters are aligned in the same orientation, the securing tab 724 is located opposite the insertion channel 727. In other words, if the insertion channel 727 is at zero degrees, the securing tab 724 is located at about 180 degrees. The first and second adapters 700 can be rotated with respect to each other about the longitudinal axis in a range from about 5 degrees to about 355 degrees while maintaining the temporal axial alignment of the two adapters 700. The ability to quickly disconnect the adapters 700 allows the adapters 700 to be used in a wide range of applications.

VR hand controllers can be secured in adapters 700 by feeding a wrist strap (or other safety attachment) on a handle of the VR controller through the safety opening 715 from the controller recess 712. The wrist strap can be pulled out as the handle of the VR hand controller is inserted into the controller recess 712. With the controller recess 712 extending along the longitudinal axis of the adapter 700, the handle of the VR controller can be held in fixed alignment with the longitudinal axis.

A straight extension bar can be used to align the longitudinal axis of the adapters 700 to be linearly aligned. If the extension bar is curved or bent, then the longitudinal axes of the adapters 700 can be held in a fixed orientation (e.g., the longitudinal axes are offset from each other by an angle defined by the shape of the extension bar).

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. An adapter for aligning virtual reality (VR) hand controllers, comprising:
   a first end comprising a controller recess configured to secure a VR hand controller in a fixed alignment with a longitudinal axis of the adapter and an alignment post extending outward from an end surface of the first end away from the controller recess, the alignment post comprising a securing tab extending radially outward from a side at a distal end of the alignment post;
   a second end comprising an alignment recess extending inward from an end surface of the second end and sized for insertion of the alignment post into the alignment recess, the alignment recess comprising an insertion channel extending along an inner side of the alignment recess from the end surface of the second end, the insertion channel parallel to the longitudinal axis of the adapter, and a locking groove extending around at least a portion of a circumference of the alignment recess and intersecting with the insertion channel, the locking groove perpendicular to the insertion channel; and
   one or more cross members connecting the first end to the second end of the adapter, where the longitudinal axis extends through a center of the alignment post and a center of the alignment recess;
   where the alignment post is configured to mechanically couple the first end of the adapter to a second end of another adapter by engagement with an alignment recess of the other adapter, the alignment recess of the other adapter extending inward from an end surface of the second end of the other adapter and sized for insertion of the alignment post into the alignment recess of the other adapter, the alignment recess of the other adapter comprising an insertion channel extending along an inner side of the alignment recess of the other adapter from the end surface of the second end of the other adapter, the insertion channel of the other adapter parallel to a longitudinal axis of the other adapter, and a locking groove of the other adapter extending around at least a portion of a circumference of the alignment recess of the other adapter and intersecting with the insertion channel of the other adapter, the locking groove of the other adapter perpendicular to the insertion channel of the other adapter, where engagement of the securing tab of the adapter in the locking groove of the other adapter via the insertion channel of the other adapter mechanically couples the adaptors thereby providing temporal axial alignment of the adapters.

2. The adapter of claim 1, wherein the locking groove extends around the circumference of the alignment recess.

3. The adapter of claim 1, wherein the locking groove is at a distal end of the alignment recess, opposite the end surface of the second end.

4. The adapter of claim 3, wherein the distal end of the alignment recess is open or is enclosed.

5. The adapter of claim 1, wherein the securing tab is located on a first side of the longitudinal axis of the adapter, and the insertion channel is located on a second side of the longitudinal axis opposite the first side.

6. The adapter of claim 1, wherein the controller recess is configured to at least partially encircle a portion of the VR hand controller when inserted in the controller recess to secure the VR hand controller in the fixed alignment with the longitudinal axis of the adapter.

7. The adapter of claim 6, wherein the controller recess is configured to encircle the portion of the VR hand controller when inserted in the controller recess.

8. The adapter of claim 1, wherein the first end further comprises a safety opening adjacent to the controller recess, the safety opening allowing a safety attachment of the VR hand controller to extend through the safety opening.

9. An adapter for aligning virtual reality (VR) hand controllers, comprising:
 a first end comprising a controller recess configured to secure a VR hand controller in a fixed alignment with a longitudinal axis of the adapter and an alignment recess extending inward from an end surface of the first end, the alignment recess comprising an insertion channel extending along an inner side of the alignment recess from the end surface of the first end, the insertion channel parallel to the longitudinal axis of the adapter, and a locking groove extending around at least a portion of a circumference of the alignment recess and intersecting with the insertion channel, the locking groove perpendicular to the insertion channel;
 a second end comprising an alignment post extending outward from an end surface of the second end and sized for insertion into the alignment recess, the alignment post comprising a securing tab extending radially outward from a side at a distal end of the alignment post; and
 one or more cross members connecting the first end to the second end of the adapter, where the longitudinal axis extends through a center of the alignment post and a center of the alignment recess;
 where the alignment post is configured to mechanically couple the second end of the adapter to a first end of another adapter by engagement with an alignment recess of the other adapter, the alignment recess of the other adapter extending inward from an end surface of the first end of the other adapter and sized for insertion of the alignment post into the alignment recess of the other adapter, the alignment recess of the other adapter comprising an insertion channel extending along an inner side of the alignment recess of the other adapter from the end surface of the first end of the other adapter, the insertion channel of the other adapter parallel to a longitudinal axis of the other adapter, and a locking groove of the other adapter extending around at least a portion of a circumference of the alignment recess of the other adapter and intersecting with the insertion channel of the other adapter, the locking groove of the other adapter perpendicular to the insertion channel of the other adapter, where engagement of the securing tab of the adapter in the locking groove of the other adapter via the insertion channel mechanically couples the adaptors thereby providing temporal axial alignment of the adapters.

10. The adapter of claim 9, wherein the locking groove extends around the circumference of the alignment recess.

11. The adapter of claim 9, wherein the locking groove is at a distal end of the alignment recess, opposite the end surface of the second end.

12. The adapter of claim 9, wherein the securing tab is located on a first side of the longitudinal axis of the adapter, and the insertion channel is located on a second side of the longitudinal axis opposite the first side.

13. A system for virtual reality (VR) hand controller alignment, comprising:
 a first adapter comprising a first end, a second end and one or more cross members connecting the first and second ends of the first adapter, the first end comprising a controller recess configured to secure a first VR hand controller in a fixed alignment with a longitudinal axis of the first adapter;
 a second adapter comprising a first end, a second end and one or more cross members connecting the first and second ends of the second adapter, the first end comprising a controller recess configured to secure a second VR hand controller in a fixed alignment with a longitudinal axis of the second adapter; and
 the first adapter mechanically coupled to the second adapter in a fixed temporal orientation via a post coupling assembly installed in the first end or the second end of the first adapter and a recess coupling assembly installed in the first end or the second end of the second adapter, wherein:
 the first end of the first adapter comprises the post coupling assembly including an alignment post extending outward from an end surface of the first end away from the controller recess, the alignment post comprising a securing tab extending radially outward from a side at a distal end of the alignment post; and
 the second end of the second adapter comprises the recess coupling assembly including an alignment recess extending inward from an end surface of the second end and sized for insertion of the alignment post into the alignment recess, the alignment recess comprising an insertion channel extending along an inner side of the alignment recess from the end surface of the second end, the insertion channel parallel to the longitudinal axis of the second adapter, and a locking groove extending around at least a portion of a circumference of the alignment recess and intersecting with the insertion channel, the locking groove perpendicular to the insertion channel.

14. The system of claim 13, wherein the longitudinal axis of the first adapter is in temporal axial alignment with the longitudinal axis of the second adapter.

15. The adapter of claim 13, wherein the locking groove extends around the circumference of the alignment recess.

16. The system of claim 13, wherein the first adapter is coupled to the second adapter in the fixed temporal orientation via an extension bar coupled between the post coupling assembly and the recess coupling assembly.

17. The system of claim 16, wherein the first adapter is held in temporal axial alignment with the second adapter through the extension bar.

18. A system for virtual reality (VR) hand controller alignment, comprising:
- a first adapter comprising a first end, a second end and one or more cross members connecting the first and second ends of the first adapter, the first end comprising a controller recess configured to secure a first VR hand controller in a fixed alignment with a longitudinal axis of the first adapter;
- a second adapter comprising a first end, a second end and one or more cross members connecting the first and second ends of the second adapter, the first end comprising a controller recess configured to secure a second VR hand controller in a fixed alignment with a longitudinal axis of the second adapter; and
- the first adapter mechanically coupled to the second adapter in a fixed temporal orientation via a post coupling assembly installed in the first end or the second end of the first adapter and a recess coupling assembly installed in the first end or the second end of the second adapter, wherein:
- the second end of the first adapter comprises the post coupling assembly including an alignment post extending outward from an end surface of the second end away from the controller recess, the alignment post comprising a securing tab extending radially outward from a side at a distal end of the alignment post; and
- the first end of the second adapter comprises the recess coupling assembly including an alignment recess extending inward from an end surface of the first end and sized for insertion of the alignment post into the alignment recess, the alignment recess comprising an insertion channel extending along an inner side of the alignment recess from the end surface of the first end, the insertion channel parallel to the longitudinal axis of the second adapter, and a locking groove extending around at least a portion of a circumference of the alignment recess and intersecting with the insertion channel, the locking groove perpendicular to the insertion channel.

19. The system of claim 18, wherein the longitudinal axis of the first adapter is in temporal axial alignment with the longitudinal axis of the second adapter.

20. The adapter of claim 18, wherein the locking groove extends around the circumference of the alignment recess.

21. The system of claim 18, wherein the first adapter is coupled to the second adapter in the fixed temporal orientation via an extension bar coupled between the post coupling assembly and the recess coupling assembly.

* * * * *